(12) United States Patent
Sato et al.

(10) Patent No.: US 11,301,441 B2
(45) Date of Patent: Apr. 12, 2022

(54) INFORMATION PROCESSING SYSTEM AND INFORMATION PROCESSING METHOD

(71) Applicant: Hitachi, Ltd., Tokyo (JP)

(72) Inventors: Misa Sato, Tokyo (JP); Kohsuke Yanai, Tokyo (JP); Toshihiko Yanase, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 62 days.

(21) Appl. No.: 15/923,875

(22) Filed: Mar. 16, 2018

(65) Prior Publication Data
US 2019/0026324 A1 Jan. 24, 2019

(30) Foreign Application Priority Data

Jul. 20, 2017 (JP) .............................. JP2017-141076

(51) Int. Cl.
*G06F 16/21* (2019.01)
*G06F 16/332* (2019.01)
(Continued)

(52) U.S. Cl.
CPC ........ *G06F 16/217* (2019.01); *G06F 16/2246* (2019.01); *G06F 16/2365* (2019.01); *G06F 16/285* (2019.01); *G06F 16/332* (2019.01)

(58) Field of Classification Search
CPC .. G06F 16/322; G06F 16/2246; G06F 16/217; G06F 16/2365; G06F 16/285; G06F 16/332
See application file for complete search history.

(56) References Cited

U.S. PATENT DOCUMENTS 5,497,319 A * 3/1996 Chong ................... G06F 40/55
704/2
6,081,774 A * 6/2000 de Hita ............... G06F 16/3338
704/9
(Continued)

FOREIGN PATENT DOCUMENTS

JP 2001-242885 A 9/2001
JP 2006-171969 A 6/2006
(Continued)

OTHER PUBLICATIONS

Ramakrishnan et al., "Database Management Systems", 2003, McGraw-Hill Education, 3rd edition, pp. 63-66 (Year: 2003).*
(Continued)

*Primary Examiner* — Tamara T Kyle
*Assistant Examiner* — Lana Alagic
(74) *Attorney, Agent, or Firm* — Crowell & Moring LLP

(57) ABSTRACT

An information processing system comprises a processor for executing a program, a storage device for storing the program, a word dictionary database for storing a word group corresponding to a group of words grouped according to a predetermined attribute and a rule database for storing a tree structure pattern obtained by abstracting tree structure data indicating relations between words in a sentence, by use of the word group. The processor executes acceptance processing of accepting a maintenance request, and maintenance processing of, when the maintenance request accepted in the acceptance processing is a maintenance request related to a word, maintaining the word dictionary database as for a word group, the word belonging to the word group, while when the maintenance request is a maintenance request related to the tree structure pattern, maintaining the rule database as for the tree structure pattern.

7 Claims, 16 Drawing Sheets

(51) Int. Cl.
*G06F 16/28* (2019.01)
*G06F 16/22* (2019.01)
*G06F 16/23* (2019.01)

(56) References Cited

U.S. PATENT DOCUMENTS

| | | | | |
|---|---|---|---|---|
| 6,119,077 | A * | 9/2000 | Shinozaki | G06F 17/274 704/3 |
| 6,411,962 | B1 * | 6/2002 | Kupiec | G06F 16/313 |
| 6,928,448 | B1 * | 8/2005 | Franz | G06F 17/2755 |
| 7,231,379 | B2 * | 6/2007 | Parikh | G06F 16/322 |
| 7,493,252 | B1 * | 2/2009 | Nagano | G06F 16/30 704/9 |
| 8,898,166 | B1 * | 11/2014 | Navrides | G06F 17/2705 707/736 |
| 10,332,508 | B1 * | 6/2019 | Hoffmeister | G10L 15/16 |
| 10,388,274 | B1 * | 8/2019 | Hoffmeister | G06N 3/0445 |
| 2002/0173958 | A1 * | 11/2002 | Asano | G10L 15/08 704/251 |
| 2003/0023442 | A1 * | 1/2003 | Akabane | G06Q 30/06 704/260 |
| 2004/0225646 | A1 * | 11/2004 | Sasaki | G06F 16/3344 |
| 2004/0243394 | A1 * | 12/2004 | Kitamura | G06F 40/211 704/9 |
| 2005/0188330 | A1 * | 8/2005 | Griffin | G06F 3/0237 715/816 |
| 2005/0246316 | A1 * | 11/2005 | Lawson | G16C 20/70 |
| 2007/0179776 | A1 * | 8/2007 | Segond | G06F 40/211 704/9 |
| 2008/0010259 | A1 * | 1/2008 | Feng | G06F 16/9537 |
| 2009/0198488 | A1 * | 8/2009 | Vigen | G06F 17/274 704/9 |
| 2009/0210411 | A1 * | 8/2009 | Murata | G10L 15/1822 |
| 2009/0240487 | A1 * | 9/2009 | Shen | G06F 40/55 704/9 |
| 2011/0078167 | A1 * | 3/2011 | Sundaresan | G06F 40/30 707/765 |
| 2011/0307241 | A1 * | 12/2011 | Waibel | G10L 15/265 704/2 |
| 2014/0214833 | A1 * | 7/2014 | Ozonat | G06F 16/355 707/737 |
| 2015/0178271 | A1 * | 6/2015 | Selegey | G06F 17/2827 704/9 |
| 2015/0206031 | A1 * | 7/2015 | Lindsay | G06F 16/35 382/218 |
| 2016/0336004 | A1 * | 11/2016 | Minnis | G06F 40/232 |
| 2017/0068655 | A1 * | 3/2017 | Wang | G06F 17/277 |
| 2017/0371858 | A1 * | 12/2017 | Hosokawa | G06F 3/0482 |
| 2018/0060302 | A1 * | 3/2018 | Liang | G06F 40/289 |

FOREIGN PATENT DOCUMENTS

| | | |
|---|---|---|
| JP | 2008-129662 A | 6/2008 |
| JP | 2010-267247 A | 11/2010 |

OTHER PUBLICATIONS

Stevenson, M., Greenwood, M.A. (2009) "Dependency Pattern Models for Information Extraction". Res on Lang and Comput 7, 13. (Year: 2009).*

European Search Report issued in counterpart European Application No. 18161495.9 dated May 25, 2018 with English translation (nine (9) pages).

Reiss et al., "An Algebraic Approach to Rule-Based Information Extraction," IEEE 24th international Conference on Data Engineering, ICDE, Apr. 7, 2008, pp. 933-942, Piscataway, New Jersey, XP031246051.

SAE1962 et al., "Database Normalization", Wikipedia, pp. 1-6, Jul. 19, 2017, XP055471792, Retrieved from the internet: https://en.wikipedia.org/w/index.php?title=Database_normalization&oldid=791282721.

Levy et al., "Tregex and Tsurgeon: tools for querying and manipulating tree data structures", Proceedings of LREC-2006, 2006, four pages.

Japanese-language Office Action issued in Japanese Application No. 2017-141076 dated Apr. 6, 2021 with English translation (17 pages).

* cited by examiner st1

> Japanese electronics maker Nichiritsu will spin off its home appliance and industrial equipment divisions by April to become quicker in decision-making to respond to market changes.

*FIG.8* tr1
```
(.POS=ROOT&.lemma=will
 (.POS=S&.lemma=will
  (.POS=NP&.lemma=Nichiritsu
   (.POS=JJ&.lemma=japanese _)
   (.POS=NNS&.lemma=electronics _)
   (.POS=NN&.lemma=maker _)
   (.POS=NNP&.lemma=Nichiritsu _))
  (.POS=VP&.lemma=will
   (.POS=MD&.lemma=will _)
   (.POS=VP&.lemma=spin
    (.POS=VB&.lemma=spin _)
    (.POS=PRT&.lemma=off
     (.POS=RP&.lemma=off _))
    (.POS=NP&.lemma=division
     (.POS=PRP$&.lemma=its _)
     (.POS=NN&.lemma=home _)
     (.POS=NN&.lemma=appliance _)
     (.POS=CC&.lemma=and _)
     (.POS=JJ&.lemma=industrial _)
     (.POS=NN&.lemma=equipment _)
     (.POS=NNS&.lemma=division _))
    (.POS=PP&.lemma=by
``` tp1
```
(.POS=S
 (#a1.POS=NP *)
 (.POS=VP
  (.POS=MD _)
  (.POS=VP
   (#a0.POS=VB&.lemma=spin _)
   (.POS=PRT
    (.POS=RP&.lemma=off _))
   (#a2.POS=NP *)
  ) ) )
```

*FIG.9*

| SAMPLE OF PATTERN EXPRESSION | MEANING |
|---|---|
| (.POS=PRT *) | Subtree whose POS is PRT. |
| (.POS=VB\|VBD _) | Leaf node whose POS is VB or VBD |
| (.POS=VB&.lemma=spin _) | Leaf node POS of which is VB, and the lemma of which is *spin*. |
| (.POS=VP * (.lemma= \dic.affect _) | Leaf node POS of which is VP, and the lemma of which is *affect*. |
| (#a0.POS=VB _) | Leaf node whose POS is VB. Retrieve the matched node with the name of a0. |
| (.POS=NP&.type!=tmod *) | Subtree POS of which is NP, the dependency type of which is not *tmod*. |
| * | Zero or more occurrences of any subtree. |
| (*.POS!=NP\|NN\|NNS *) | Zero or more occurrences of the subtree whose POS is not NP, NN, nor NNS. |
| (?.POS=MD\|CC\|VP\|, *) | Zero or one occurrences of the subtree whose POS is MD, CC or VP. |
| (+.POS=NN\|NP *) | One or more occurrences of the subtree whose POS is NN or NP. |

*FIG.10*

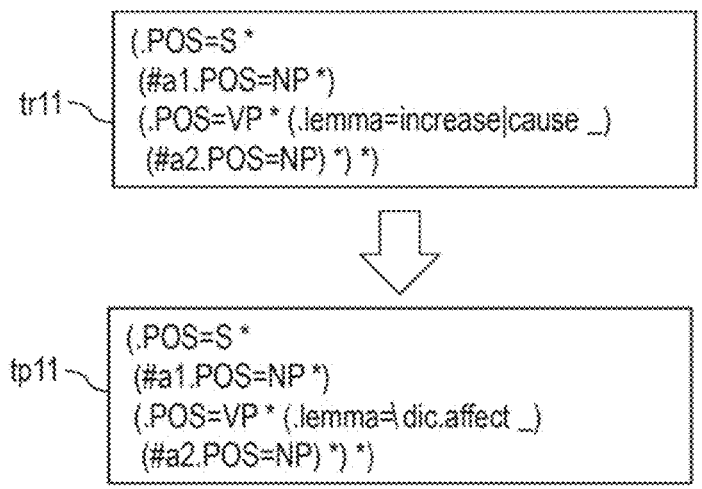

*FIG.11*

INFORMATION PROCESSING SYSTEM AND INFORMATION PROCESSING METHOD

CLAIM OF PRIORITY

The present application claims priority from Japanese patent application JP 2017-141076 filed on Jul. 20, 2017, the content of which is hereby incorporated, by reference into this application.

BACKGROUND

The present invention relates to an information processing system and an information processing method for processing information.

Japanese Patent Application Laid-Open Publication No. 2006-171969 discloses a document processing apparatus capable of outputting a keyword having a specific attribute. When a medical report to be processed is input, the document processing apparatus gives a morphological analysis unit a character string included in the medical report, and the morphological analysis unit divides the character string into words and generates a word list. A word extraction unit determines whether a thesaurus code of a selected word in the word list specified by a thesaurus search unit meets an extraction condition, extracts the selected word in the case where the code meets the condition, and outputs the selected word as a keyword.

Japanese Patent Application Laid-Open Publication No. 2008429662 discloses an information extraction device for performing subtree matching at high speed. The information extraction device includes a word dictionary; an analyzing unit for generating a syntax tree for each sentence in text; a parent-child index generation unit for generating a parent-child index by extracting a parent-child relation between words from the syntax tree, generating a key indicating the parent-child relation, and associating the key with a syntax tree ID for specifying the syntax tree and a node ID column in the syntax tree of words included in the parent-child relation; and an extraction unit for specifying an extraction target from a targeted syntax tree to perform action to the specified target, by reading an information extraction rule including a rule condition syntax tree and the action, generating a search key in the same format as the parent-child index from the rule condition syntax tree of a search condition, narrowing down the targeted syntax trees through searching for the parent-child index by use of the generated search key and performing matching of the rule condition syntax tree with the syntax tree, and performing mapping between nodes with the syntax tree and the rule condition syntax tree by use of the node ID column.

In other words, in order to reduce the time required for matching the subtree of the syntax, the information extraction device assigns a unique index describing a parent-child relation of words to text and a rule, and in advance narrows down syntax trees to be targeted for information extraction.

Tgrep 2 is a grep tool for syntax tree expression. The tool enables searching syntax tree expression with a query of a specific syntax tree. Document Levy (Levy, R. and Andrew. G.: Tregex and Tsurgeon: tools for querying and manipulating tree data structures, in Proceedings of LREC-2006, 2006.) discloses a syntax tree query tool Tregex having richer expression than Tgrep 2. The syntax tree query tool Tregex extracts relations according to a syntax rule described in one line.

However, in the above-described conventional technique, syntactic rules, words and parts of speech coexist without being separated in the database, and thus database maintenance is difficult. Specifically, in the case of adding a word to a database, an operator has to check which syntax rule is to be associated with the word to be added. An operator also has to check duplication of syntax rules, and duplication of extraction rules tightens limited storage capacity.

SUMMARY

The object of the present invention is to facilitate database maintenance.

An aspect of the invention disclosed in this application is an information processing system comprises a processor for executing a program, a storage device for storing the program, a word dictionary database for storing a word group corresponding to a group of words grouped according to a predetermined attribute and a rule database for storing a tree structure pattern obtained by abstracting tree structure data indicating relations between words in a sentence, by use of the word group. The processor executes acceptance processing of accepting a maintenance request, and maintenance processing of, when the maintenance request accepted in the acceptance processing is a maintenance request related to a word, maintaining the word dictionary database as for a word group, the word belonging to the word group, while when the maintenance request is a maintenance request related to the tree structure pattern, maintaining the rule database as for the tree structure pattern.

The representative embodiment of the present invention enables facilitating database maintenance. Other objects, configurations, and effects than those described above are clarified by the following description of an embodiment.

BRIEF DESCRIPTION OF THE DRAWINGS

FIG. 8 is an explanatory diagram illustrating one example of the sentence.

FIG. 9 is an explanatory diagram illustrating one example of the tree structure data and the tree structure pattern.

FIG. 10 is an explanatory diagram illustrating one example of a pattern expression.

FIG. 11 is an explanatory diagram illustrating an example of conversion by use of the pattern expression shown in FIG. 10.

DETAILED DESCRIPTION OF THE EMBODIMENT

Example of Database Maintenance

Figure 1:
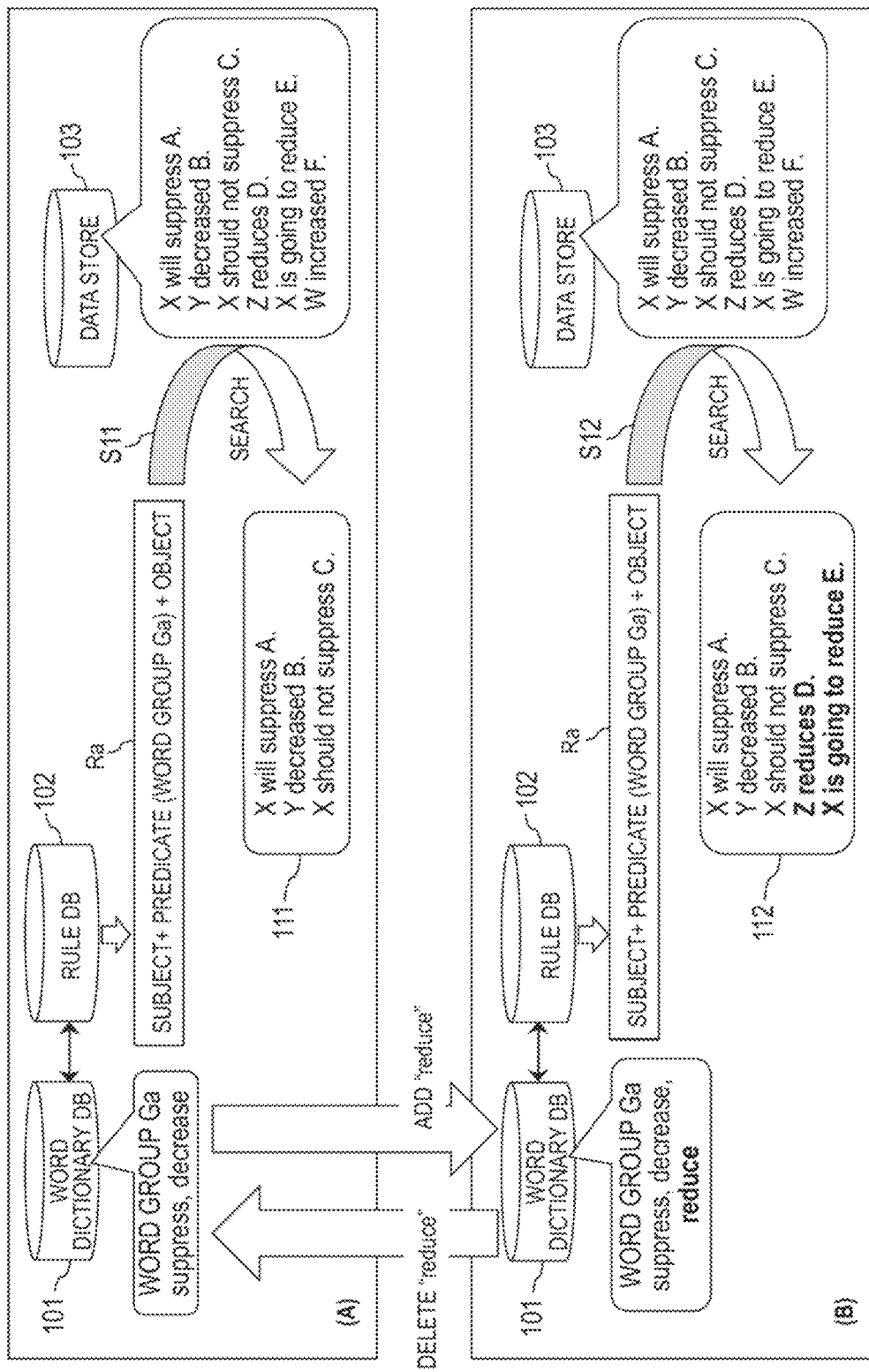
FIG. 1 is an explanatory diagram illustrating a database maintenance example 1.

FIG. 1 is an explanatory diagram illustrating a database maintenance example 1. With reference to FIG. 1, maintenance of a word dictionary DB (Database) 101 is described. The word dictionary DB 101 stores one or more word groups. A word group herein is a group of words grouped according to a predetermined attribute. A predetermined attribute herein is a feature exhibited by a targeted word group. Specific examples of the predetermined attribute in Japanese sentence include a verb whose subject is followed by case "ga" of a postpositional particle and a verb co-occurring with a specific adverb. Moreover, the predetermined attribute may be a synonym or a similar word, or a word used in a specific field (investment, medical care, etc.). In one example shown in FIG. 1, a word group Ga is a synonym group including "suppress" and "decrease."

A rule DB 102 is a database for storing a tree structure pattern indicating a rule. A tree structure pattern herein is data in which the tree structure data indicating relations between words in a sentence is abstracted by use of a word group. Tree structure data herein is, for example, a syntax tree generated according to a phrase structure rule by morphological analysis and dependency analysis (hereinafter, referred to as parsing). A rule Ra in FIG. 1 has a tree structure pattern in which a subject (wild card), a predicate and an object (wild card) are included in this word order, and a verb constituting a predicate belongs to the word group Ga.

A data store 103 stores text data of various types of sentences (for example, sentences in academic papers and books, sentences in newspapers and magazines, sentences described on web pages, etc.).

(A): When the data store 103 is searched by use of the tree structure pattern of the rule Ra (S11), a search result 111 is obtained. Each sentence in the search result 111 is text data meeting the rule Ra. Suppose that the word dictionary DB 101 is maintained so that "reduce" is added to the word group Ga of the word dictionary DB 101 in (A), and thus the state is changed to (B).

(B): When the data store 103 is searched by use of the tree structure pattern of the rule Ra (S12), a search result 112 is obtained. Even in the case where "reduce" is added to the word group Ga, searching is available without modifying the word group Ga.

In this case, each sentence in the search result 112 is text data meeting the rule Ra, and "Z reduces D." and "X is going to reduce E." each including "reduce" are further added to the search result 111. Simply maintaining the word dictionary DB 101 enables searching so as to satisfy the maintenance result of the word dictionary DB 101 without maintaining the rule DB 102.

Suppose that the word dictionary DB 101 is maintained in the state of (B) so that "reduce" is deleted from the word group Ga of the word dictionary DB 101, and thus the state is changed to (A).

(A): When the data store 103 is searched by use of the tree structure pattern of the rule Ra, the search result 111 is obtained. Even in the case where "reduce" is deleted from the word group Ga, searching is available without modifying the word group Ga.

In this case, each sentence in the search result 111 is text data meeting the rule Ra, and neither "Z reduces D." nor "X is going to reduce E." each including "reduce" in the search result 112 is found. In order to change a word, deletion or addition of a word may be performed as described above. In an example, in the case of changing a word from "reduce" to "drop" in (B), "reduce" is deleted from the word group Ga and "drop" is added. In such a manner, simply maintaining the word dictionary DB 101 enables searching so as to satisfy the maintenance result of the word dictionary DB 101 without maintaining the rule DB 102.

Figure 2:
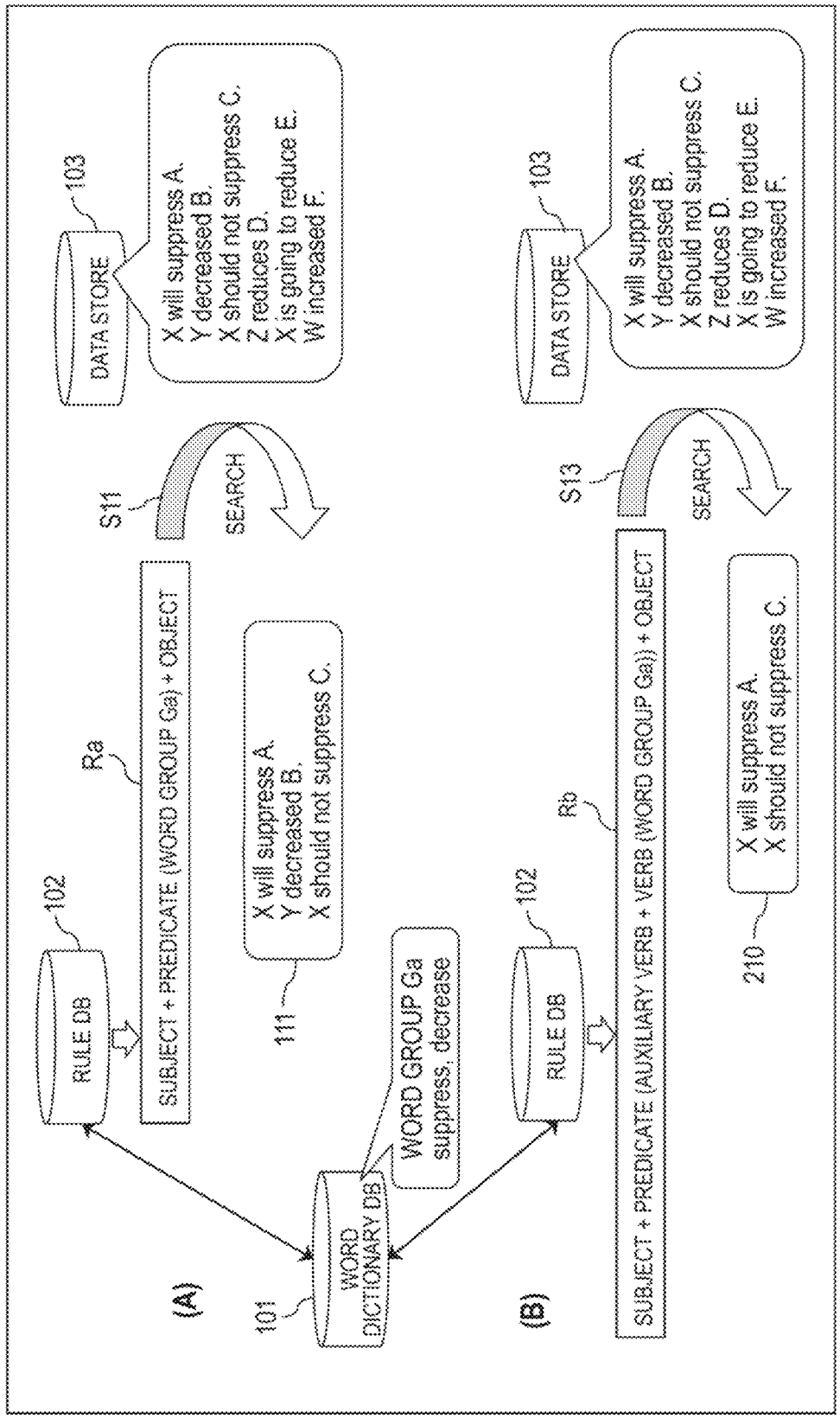
FIG. 2 is an explanatory diagram illustrating a database maintenance example 2.

FIG. 2 is an explanatory diagram illustrating a database maintenance example 2. With reference to FIG. 2, maintenance of the rule DB 102 is described. (A) is the same as (A) shown in FIG. 1. (B) illustrates a rule Rb added newly. The rule Rb has a tree structure pattern in which a subject (wild card), a predicate (auxiliary verb (wild card) and verb) and an object (wild card) are included in this word order, and a verb belongs to the word group Ga. That is, the rule Rb has the tree structure pattern in which an auxiliary verb is added to the rule Ra.

(B): When the data store 103 is searched by use of the tree structure pattern of the rule Rb (S13), a search result 210 is obtained. Each sentence in the search result 210 is text data meeting the rule Rb. In order to delete a rule, the rule Rb is simply deleted from the rule DB 102, and there is no need to maintain the word dictionary DB 101. In order to change a rule, deletion or addition of a rule may be performed as described above. In an example, in the case of changing a rule from the rule Ra to the rule Rb, the rule Ra may be called and an auxiliary verb (wild card) may be added in front of a verb (word group Ga). As described above, simply maintaining the rule DB 102 enables searching so as to satisfy the maintenance result of the rule DB 102 without maintaining the word dictionary DB 101.

Figure 3:
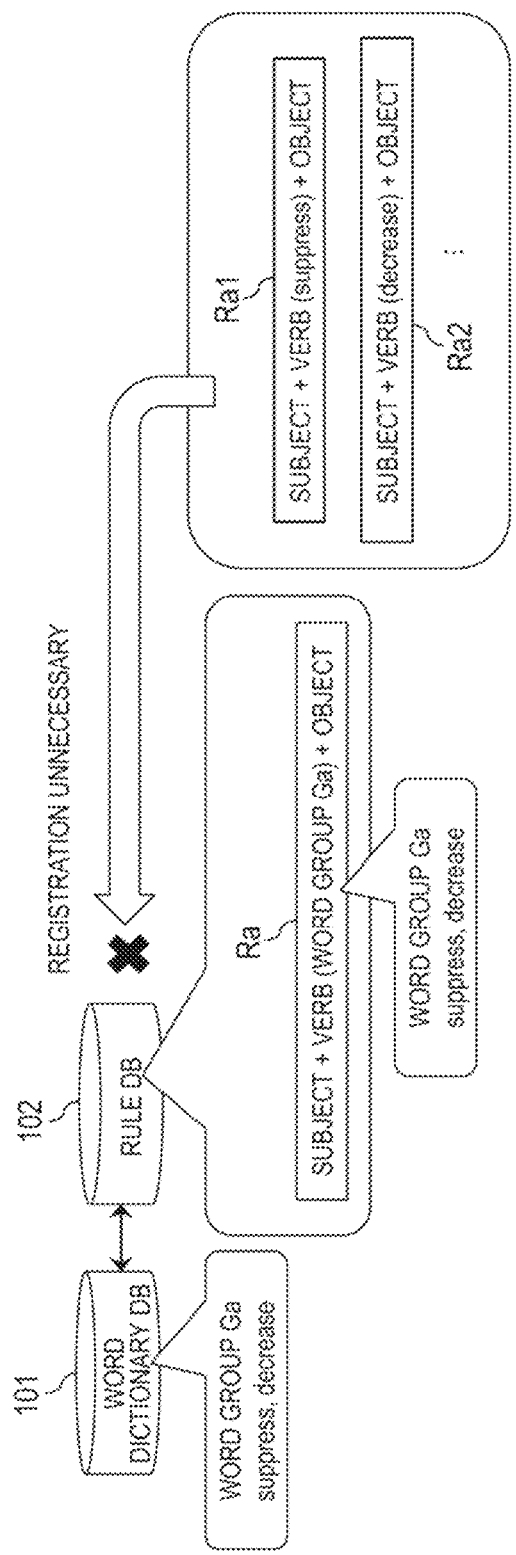
FIG. 3 is an explanatory diagram illustrating a database maintenance example 3.

FIG. 3 is an explanatory diagram illustrating a database maintenance example 3. With reference to FIG. 3, maintenance of the rule DB 102 is described. In the case where a word group is used in a rule, there is no need to register a rule for each word in the word group with the rule DB 102. In one example, since the rule Ra uses the word group Ga, there is no need to register a rule Ra1 or a rule Ra2 for each verb with the rule DB 102. This enables suppressing duplication of rules and resulting in saving memory of the rule DB 102.

Example of Hardware Configuration of Information Processing System

An example of a hardware configuration of one unit or more of a computer 400 included in an information processing system is described below.

Figure 4:
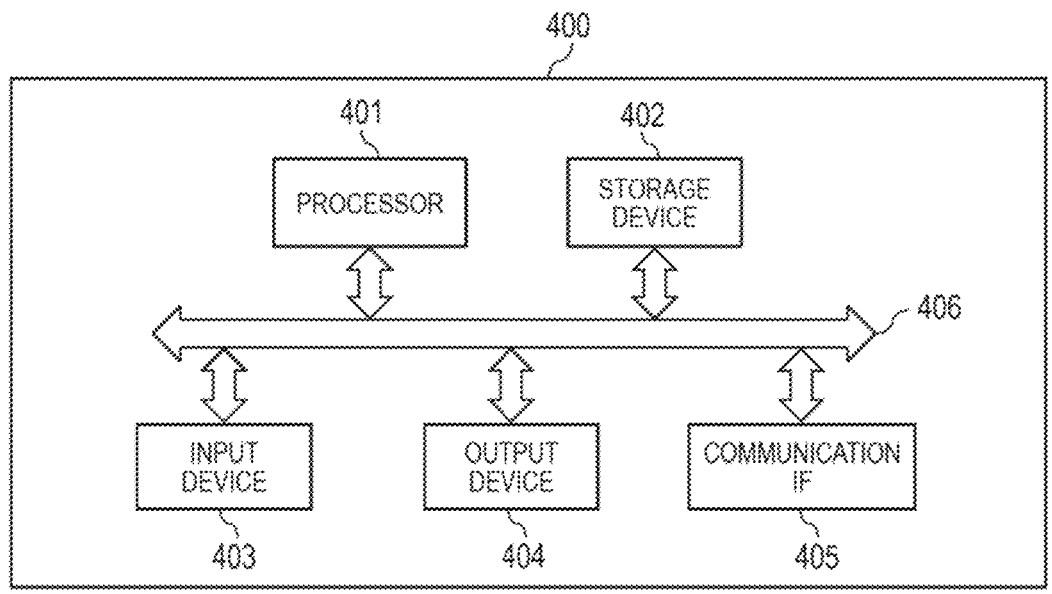
FIG. 4 is a block diagram illustrating an example of a hardware configuration of a computer.

FIG. 4 is a block diagram illustrating an example of a hardware configuration of a computer. The computer 400 has a processor 401, a storage device 402, an input device 403, an output device 404 and a communication interface (communication IF 405). The processor 401, the storage device 402, the input device 403, the output device 404 and the communication IF 405 are connected by a bus 406. The processor 401 controls the computer 400. The storage device 402 serves as a work area of the processor 401. The storage device 402 is a non-transitory or transitory storage medium for storing various types of programs and data. Examples of the storage device 402 include a ROM (Read Only Memory), a RAM (Random Access Memory), an HDD (Hard Disk Drive), and a flash memory. The input device 403 inputs data. Examples of the input device 403 include a keyboard, a mouse, a touch panel, a numeric keypad, and a scanner. The output device 404 outputs data. Examples of the output device 404 include a display and a printer. The communication IF 405 is connected to the network to transmit and receive data.

Examples of Storage Contents in Database

The following description is about examples of storage contents in the word dictionary DB 101, the rule DB 102, and the data store 103, which are described above. The word dictionary DB 101, the rule DB 102 and the data store 103 may be realized by the storage device 402 in the computer 400 shown in FIG. 4, or may be realized by another computer accessible via the communication IF 405. It is noted that in the following description of a database or a table, a value of AA field bbb (AA is a field name, and bbb is a code) may be expressed as AAbbb. In an example, the value of a group ID field 501 is expressed as a group ID 501.

Figure 5:
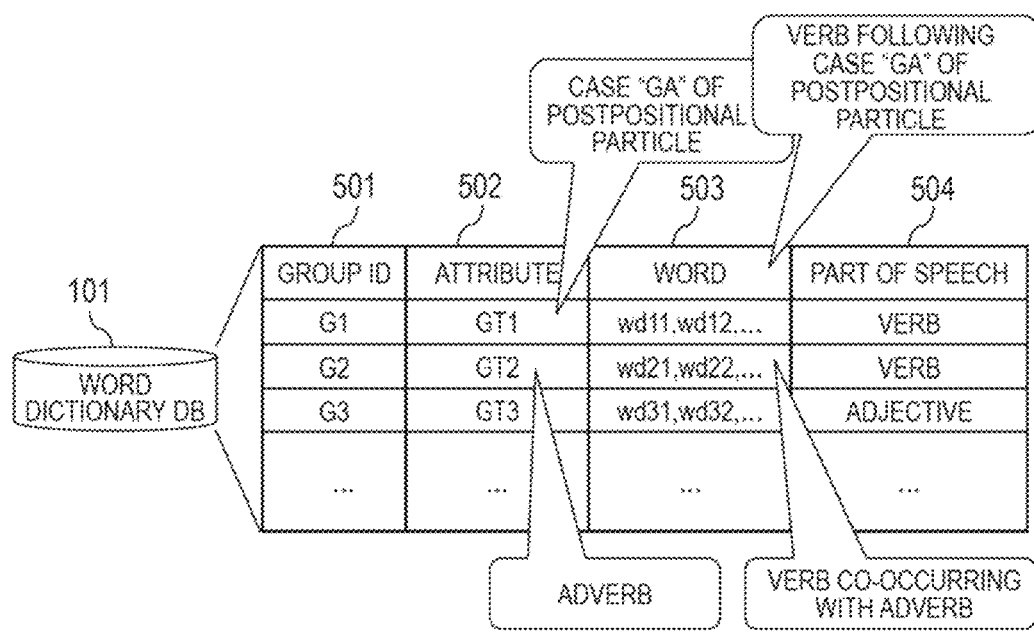
FIG. 5 is an explanatory diagram illustrating an example of storage contents in the word dictionary DB.

FIG. 5 is an explanatory diagram illustrating an example of storage contents in the word dictionary DB 101. The word dictionary DB 101 has a group ID field 501, an attribute field 502, a word field 503, and a part of speech field 504. The combination of values of the fields 501 to 504 in the same line defines an entry indicating one word group. The group ID field 501 is a storage area for storing group IDs. The group ID 501 is identification information for uniquely specifying word groups.

The attribute field 502 is a storage area for storing attributes. The attribute 502 is a feature exhibited by a targeted word group. Specific examples in Japanese sentence include a verb whose subject is followed by case "ga" of a postpositional particle and a verb co-occurring with a specific adverb. Moreover, an attribute herein may be a synonym or a similar word, or a word used in a specific field (investment, medical care, etc.).

The word field 503 is a storage area for storing words. The word 503 is a word belonging to a targeted word group. An operator (user or administrator) can add, change, and delete the word 503 with respect to the word field 503.

The part of speech field 504 is a storage area for storing parts of speech. The part of speech 504 is a classification of words belonging to a word group classified according to form and role. It is noted that the part of speech 504 may specify a form of words. In the case of English words, a verb is specified from among, for example, base form (current form), past tense, past particle and present progressive form; a noun is specified from among, for example, uncountable noun, countable noun, singular form and plural form; and each of an adjective and an adverb is specified from among, for example, positive degree, comparative degree, and superlative degree. In the case where only a part of speech is specified (in the case where a form is not specified), all forms of the part of speech 504 may be included.

Figure 6:
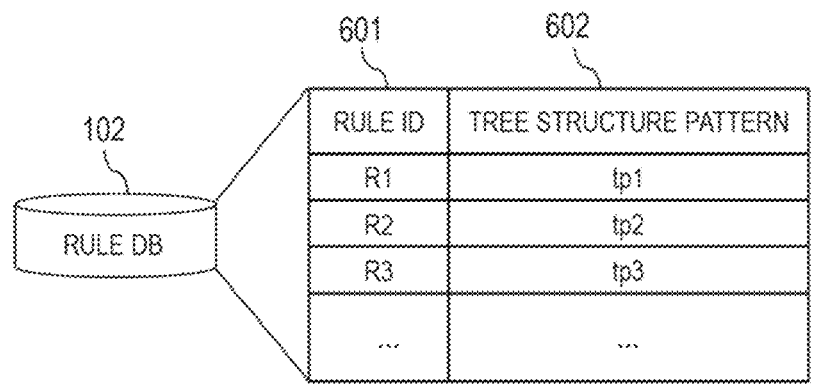
FIG. 6 is an explanatory diagram illustrating an example of storage contents in the rule DB.

FIG. 6 is an explanatory diagram illustrating an example of storage contents in the rule DB 102. The rule DB 102 has a rule ID field 601 and a tree structure pattern field 602. The combination of values of the fields 601 and 602 in the same line defines an entry indicating one rule. The rule ID field 601 is a storage area for storing rule IDs. The rule ID 601 is identification information for uniquely specifying rules. The tree structure pattern field 602 is a storage area for storing tree structure patterns. An operator can add, change, and delete the tree structure pattern 602 with respect to the tree structure pattern field 602. Each of FIG. 1 to FIG. 3 illustrates a rule in which a word group is used as a verb in the tree structure pattern 602, and a wild card is used as each of a subject and an object. Alternatively, in the tree structure pattern 602, a word group may be used as a word or phrase other than a predicate, such as a subject or an object, and a wild card may be used as another word or phrase. Another rule may be used, in which a plurality of word groups are specified in one tree structure pattern 602.

Figure 7:
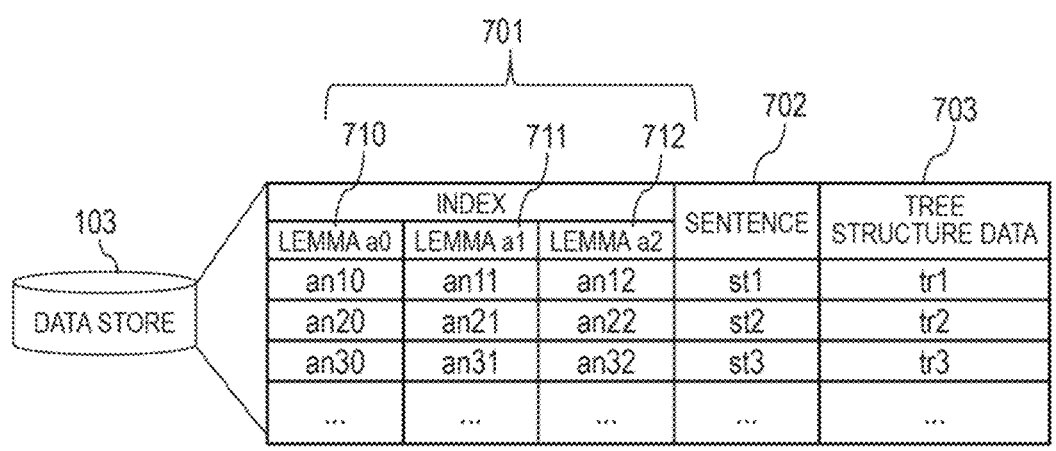
FIG. 7 is an explanatory diagram illustrating an example of storage contents in the data store.

FIG. 7 is an explanatory diagram illustrating an example of storage contents in the data store 103. The data store 103 has an index field 701, a sentence field 702, and a tree structure data field 703, The combination of values of the fields 701 to 703 in the same line defines an entry with respect to one sentence.

The index field 701 is a storage area for storing indexes, and is used for index search. The index field 701 has a plurality of lemma fields (FIG. 7 illustrates three fields of a lemma a0 field 710, a lemma a1 field 711 and a lemma a2 field 712). The lemma a0 field 710 is a storage area for suiting the indexes 701 each having been set in advance as a lemma a0. Each of the lemma a1 field 711 and the lemma a2 field 712 is a storage area for storing the indexes 701 to be served as a lemma a1 and a lemma a2, respectively. The initial state of each of the lemma a1 field 711 and the lemma a2 field 712 is blank, and the lemmas a1 and a2 are added thereto respectively at the time of index-updating described below.

The sentence field 702 is a storage area for storing sentences. The sentence 702 is text data to be parsed to obtain the tree structure data 703. The tree structure data field 703 is a storage area for storing tree structure data each obtained by parsing a sentence according to a phrase structure rule.

Examples of Various Types of Data

FIG. 8 is an explanatory diagram illustrating one example of the sentence 702. FIG. 8 illustrates one example of an English sentence st1. Alternatively, the sentence 702 may be in another language such as in Japanese, without being limited to English.

FIG. 9 is an explanatory diagram illustrating one example of the tree structure data and the tree structure pattern. A tree structure data tr1 is a syntax tree obtained by parsing the sentence st1 shown in FIG. 8 according to a phrase structure rule. In the tree structure data tr1, "POS" indicates a part of speech, and "ROOT" indicates a root of the syntax tree. An alphabet string having one to three letters in capitals indicates a type of part of speech (noun, verb, etc.). A tree structure pattern tp1 is a pattern obtained in such a manner that an operator deletes unnecessary information from the tree structure data tr1 and edits the resultant. The tree structure pattern tp1 indicates a rule specifying a subject (wild card), a predicate ("spin off" as a verb) and an object (wild card) in this word order.

FIG. 10 is an explanatory diagram illustrating one example of a pattern expression. A pattern expression 1000 is used when the information processing system executes information processing. By recognizing the pattern expression 1000, an operator can edit the tree structure data 703 to generate the tree structure pattern 602. In the pattern expression 1000, "_" expresses determination of a leaf node (leaf of a syntax tree); "|" expresses an option; "#" expresses extraction of a subtree (subtree in a syntax tree); "!" expresses negative; "*" expresses zero or more occurrences of any subtree; and "+" expresses one or more occurrences. It is noted that the pattern expression 1000 shown in FIG. 10 is one example.

FIG. 11 is an explanatory diagram illustrating an example of conversion by use of the pattern expression shown in FIG. 10. The selection of "increase" or "cause" whose part of speech (POS) is a verb (VP) in a tree structure data tr11 is converted to calling (\dic.) of a word group of "affect" in the group ID 501. As a result, a tree structure pattern tp11 including the word group is generated. Such conversion is executed upon edit operation by an operator.

Example of Information Processing Procedure

Figure 12:
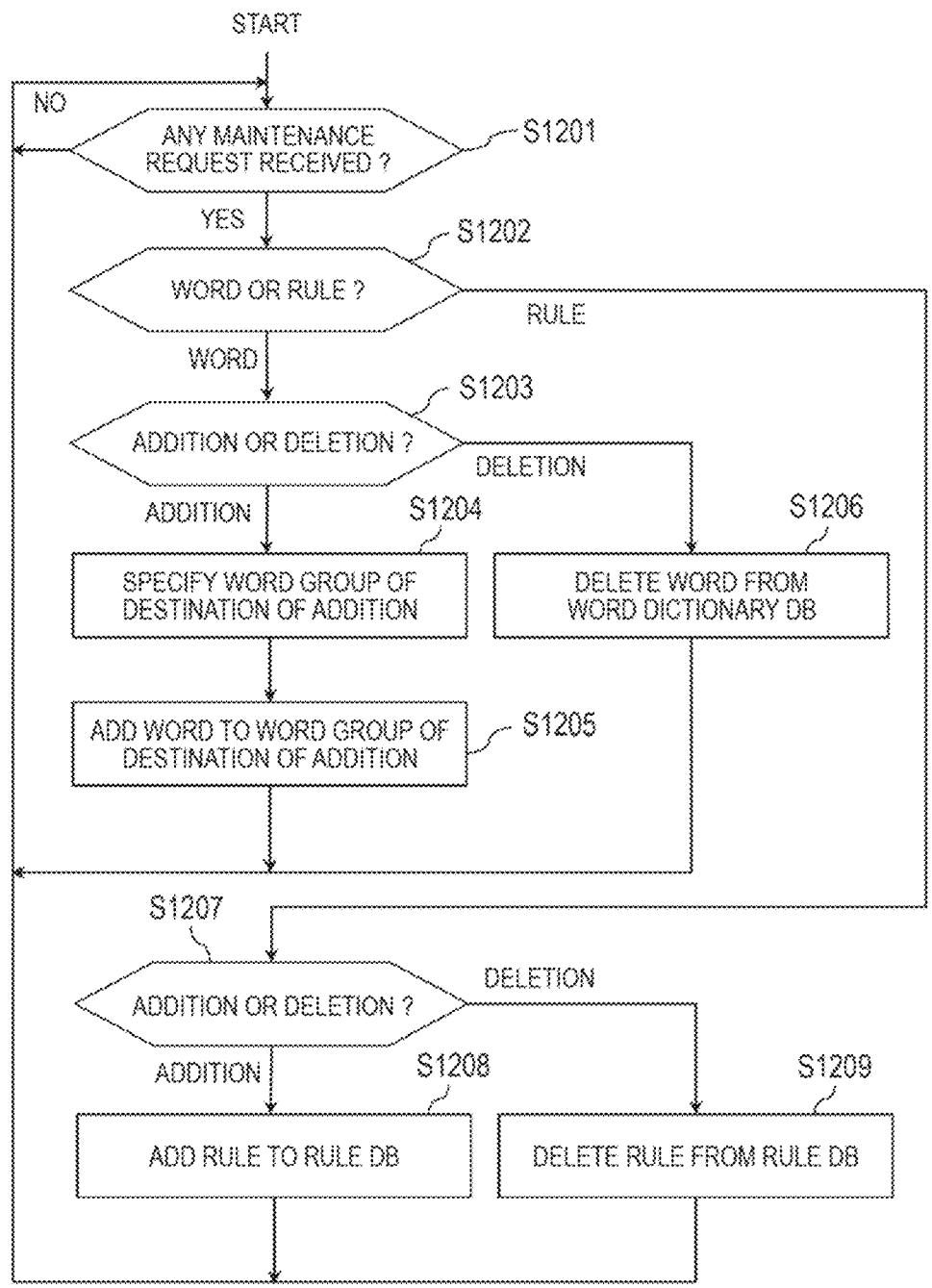
FIG. 12 is a flowchart indicating an example of information processing procedure by the information processing system.

FIG. 12 is a flowchart indicating an example of information processing procedure by the information processing system. The information processing system waits for a maintenance request (step S1201; No). The maintenance request is instructed by the processor 401, or given by a terminal via the communication IF 405 or by the input device 403. When receiving a maintenance request (step S1201; Yes), the information processing system determines whether the maintenance request is a maintenance request related to a word or a maintenance request related to a rule (tree structure pattern), on the basis of the information included in the maintenance request (step S1202).

In the case of a maintenance request related to a word (step S1202: word), the information processing system determines whether the maintenance request related to a word is a request for addition or deletion of a word, on the basis of the information included in the maintenance request related to a word (step S1203). In the case of addition of a word (step S1203: addition), the information processing system specifies a word group as destination of addition from the word dictionary DB 101 (step S1204). Specifically, in the case where the maintenance request related to a word includes a group ID of destination of addition, the information processing system specifies the word group specified by the group ID 501, as the destination of addition of the word to be added included in the maintenance request related to a word.

In the case where the maintenance request related to a word includes none of a group ID of destination of addition, the information processing system may automatically specify a word group of destination of addition. In an example, in the case where a word to be added is a word extracted from the sentence 702 included in the maintenance request related to a word, the information processing system specifies a word group having the attribute corresponding to the feature of the sentence from the word dictionary DB 101. Then, the information processing system adds the word to be added to the specified word group of destination of addition (step S1205), and returns to step S1201.

In step S1203, in the case of deletion of a word (step S1203: deletion), the information processing system deletes the word to be deleted included in the maintenance request related to a word from the word group for deletion in the word dictionary DB 101 (step S1206), and returns to step S1201. A word group for deletion herein is, for example, all entries in the word dictionary DB 101 in the case where the group ID 501 is not specified in the maintenance request relating to a word, or the entry specified by the group ID 501 in the case where the group ID 501 is specified.

In step S1202, in the case of a maintenance request related to a rule (step S1202: rule), the information processing system determines whether the maintenance request related to a rule is a request for addition or deletion of a rule, on the basis of the information included in the maintenance request related to a rule (step S1207). In the case of addition of a rule (step S1207: addition), the information processing system adds to the rule DB 102 a rule to be added included in the maintenance request related to a rule (step S1208), and returns to step S1201.

In step S1207, in the case of deletion of a rule (step S1207: deletion), the information processing system deletes an entry of the rule ID 601 included in the maintenance request related to a rule from the rule DB 102 (step S1209), and returns to step S1201.

Use Example of Information Processing System

Figure 13:
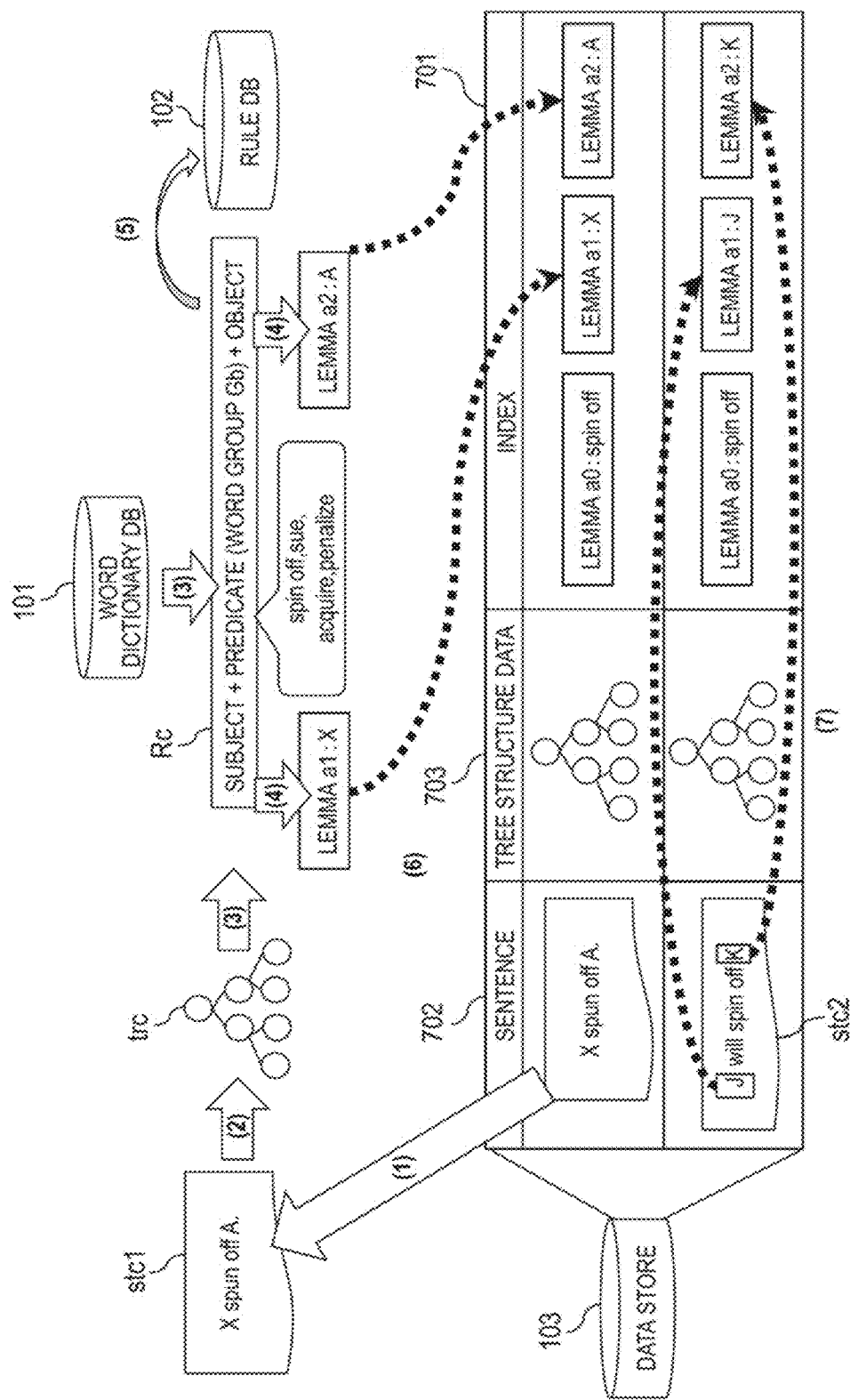
FIG. 13 is an explanatory diagram illustrating a use example of the information processing system.

FIG. 13 is an explanatory diagram illustrating a use example of the information processing system. (1): The information processing system acquires a sentence stc1 from the data store 103. In (1), the information processing system may directly acquire the sentence stc1, or may acquire the sentence stc1 by index search by use of the index 701. (2): The information processing system converts the acquired sentence stc1 into tree structure data trc by parsing. In (2), the information processing system may execute parsing. Alternatively, the information processing system may transmit the sentence stc1 to another computer, and the another computer may execute parsing and return the tree structure data trc to the information processing system. In the case of the tree structure data trc having been generated already, the information processing system calls the tree structure data trc associated with the sentence stc1 from the data store 103.

(3): The information processing system generates a tree structure pattern on the basis of the tree structure data trc upon edit operation by an operator, and sets it as a rule Rc. Suppose that a word group Gb of verbs is applied to the predicate in the rule Rc.

(4): The information processing system extracts "X" corresponding to the subject in the sentence stc1 from the tree structure pattern of the rule Rc as the lemma a1, extracts "A" corresponding to the object in the sentence stc1 as the lemma a2, and displays them on a display screen.

(5): The information processing system registers the rule Re with the rule DB 102. It is noted that in the case where a rule having the same contents has been registered already, the information processing system does not register the rule Re with the rule DB 102.

(6): The information processing system registers the tree structure data trc of (2) and the lemmas a1 and a2 of (4) as the entry of the sentence stc1 with the data store 103. This enables automatically generating the index 701 of the acquired sentence stc1 and resulting in improving the efficiency of index search thereafter.

(7): The information processing system searches other sentences than the sentence stc1 the data store 103 to specify a sentence stc2 meeting the rule Rc, and registers "J" corresponding to the subject of the entry of the sentence stc2 as the lemma a1 and "K" corresponding to the object thereof as the lemma a2 (index-updating). This gives influence on another sentence stc2, thereby enables automatically generating the index 701 and resulting in improving the efficiency of index search thereafter.

An example of a display screen in the use example shown in FIG. 13 is described with reference to FIG. 14 to FIG. 19.

Figure 14:
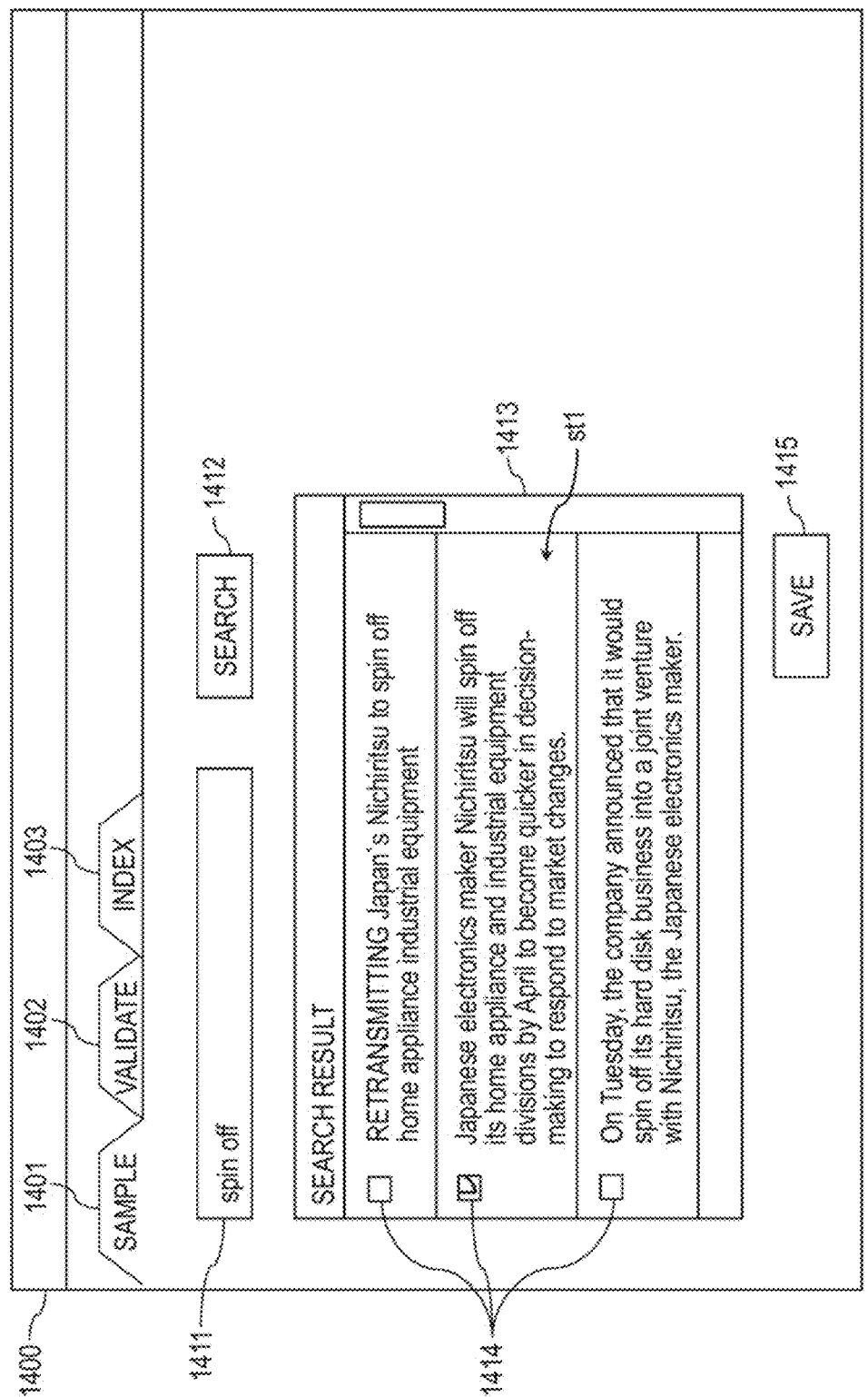
FIG. 14 is an explanatory diagram illustrating a display screen example 1 of the information processing system.

FIG. 14 is an explanatory diagram illustrating a display screen example 1 of the information processing system. A display screen 1400 has a SAMPLE tab 1401, a VALIDATE, tab 1402 and an INDEX tab 1403. FIG. 14 illustrates the SAMPLE tab 1401. The SAMPLE tab 1401 has a search keyword input box 1411, a SEARCH button 1412, and a SAVE button 1415. The search keyword input box 1411 is an input box in which an operator inputs a search keyword. The SEARCH button 1412 is a button for index-searching the data store 103 for the index 701 upon operation by an operator to extract the corresponding sentence 702. The following description is about index search in the present example. Alternatively, a full sentence of the sentence 702 may be searched for.

Suppose that, in FIG. 14, "spin off" is input into the search keyword input box 1411, and the SEARCH button 1412 is pressed, in this case, as shown in (1) of FIG. 13, the data store 103 is index-searched for the index 701, and the corresponding sentence 702 is displayed as a search result 1413. Each sentence of the search result 1413 has a check box 1414. The information processing system selects the sentence corresponding to the check box 1414 ticked by an operator. Suppose that, in FIG. 14, the sentence st1 is selected. The SAVE button 1415 is a button for saving the sentence corresponding to the check box 1414 selected from the search result 1413. When the SAVE button 1415 is pressed, the sentence st1 corresponding to the ticked check box 1414 is stored in the data store 103.

Figure 15:
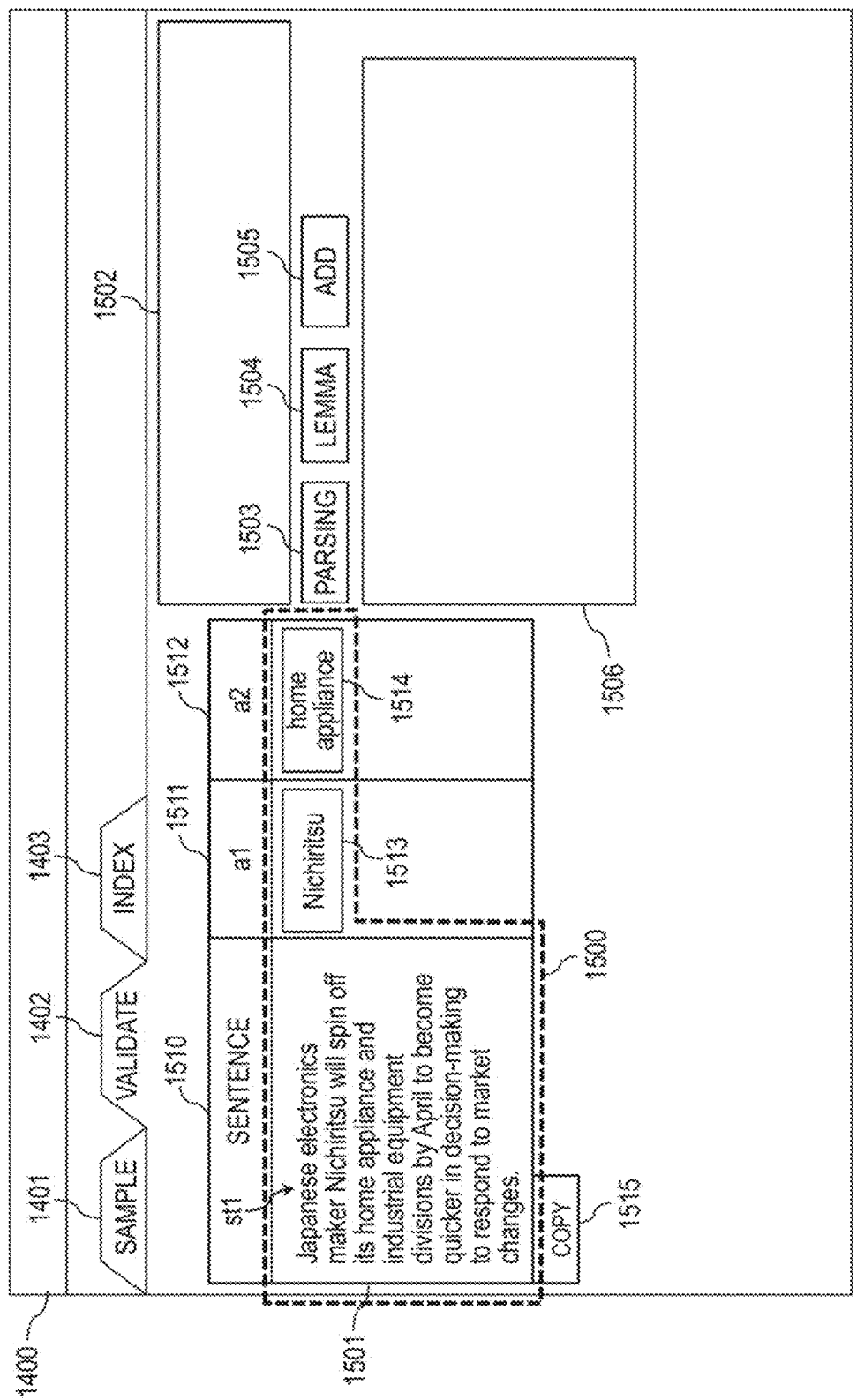
FIG. 15 is an explanatory diagram illustrating a display screen example 2 of the information processing system.

FIG. 15 is an explanatory diagram illustrating a display screen example 2 of the information processing system. The display screen example 2 is an example of the display screen in the case where the VALIDATE tab 1402 is selected with the check box 1414 ticked on the display screen example 1 shown in FIG. 14. The VALIDATE tab 1402 has a confirmation area 1501, a copy area 1502, a PARSING button 1503, a LEMMA button 1504, an ADD button 1505, and an edit area 1506. The confirmation area 1501 has a selected sentence display area 1510, a lemma a1 display area 1511 and a lemma a2 display area 1512. The selected sentence display area 1510 displays the sentence selected upon ticking in the check box 1414 in the display screen example 1 shown in FIG. 14. The lemma a1 display area 1511 is an area for displaying the lemma a1 (subject). The lemma a2 display area 1512 is an area for displaying the lemma a2 (object).

In the display screen example 2, the lemma a1 display area 1511 has a text input box for lemma a1 1513. With reference to the sentence st1 in the selected sentence display area 1510, an operator inputs a word or phrase (eg, "Nichiritsu") corresponding to the lemma a1 (subject) into the text input box for lemma a1 1513. The lemma a2 display area 1512 has a text input box for lemma a2 1514. With reference to the sentence st1 in the selected sentence display area 1510, an operator inputs a word or phrase (eg, "home appliance") corresponding to the lemma a2 (object) into the text input box for lemma a2 1514.

The combination of the sentence st1 displayed in the confirmation area 1501 the word "Nichiritsu" input into the text input box for lemma a1 1513, and the phrase "home appliance" input into the text input box for lemma a2 1514 is called a data set for confirmation 1500.

A COPY button 1515 is a button for copying the sentence displayed in the selected sentence display area 1510 into the copy area 1502 upon operation by an operator. The copy area 1502 is an area for displaying the sentence st1 copied from the selected sentence display area 1510 when the COPY button 1515 is pressed. The PARSING button 1503 is a button for parsing the sentence st1 copied into the copy area 1502 (corresponding to (2) in FIG. 13). The LEMMA button 1504 is a button for extracting a lemma of the sentence st1 from the tree structure pattern edited in the edit area 1506 (corresponding to (4) in FIG. 13). The ADD button 1505 is a button for adding the tree structure pattern edited in the edit area 1506 to the rule DB 102 as a rule (corresponding to (5) in FIG. 13).

Figure 16:
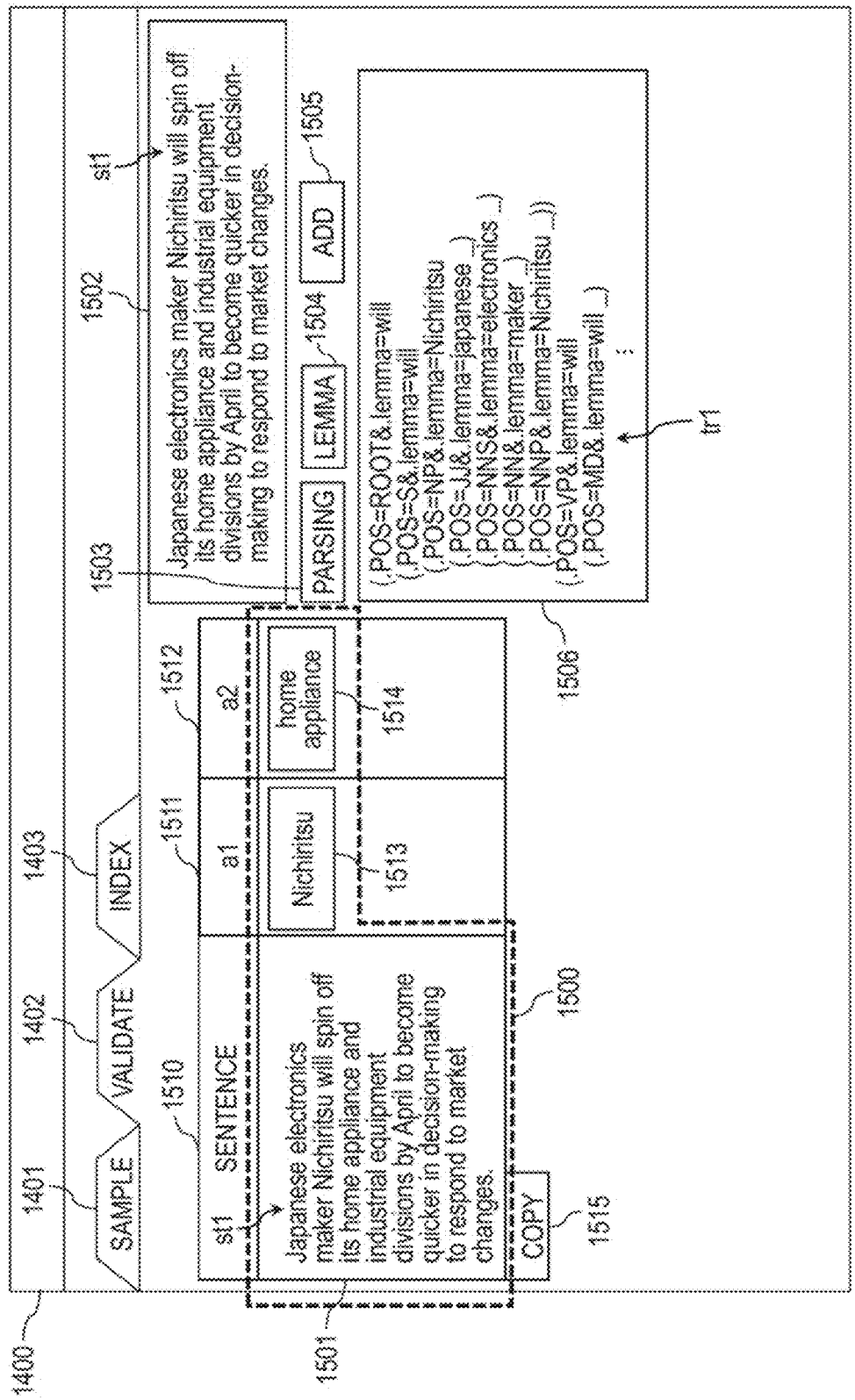
FIG. 16 is an explanatory diagram illustrating a display screen example 3 of the information processing system.

FIG. 16 is an explanatory diagram illustrating a display screen example 3 of the information processing system. The display screen example 3 is an example of the display screen in the case where the COPY button 1515 and the PARSING button 1503 are pressed on the display screen example 2 shown in FIG. 15. When an operator operates to press the COPY button 1515, the selected sentence st1 is copied into the copy area 1502. Thereafter, when an operator operates to press the PARSING button 1503, the tree structure data tr1 obtained by parsing the selected sentence st1 is displayed in the edit area 1506 (corresponding to (2) in FIG. 13).

Figure 17:
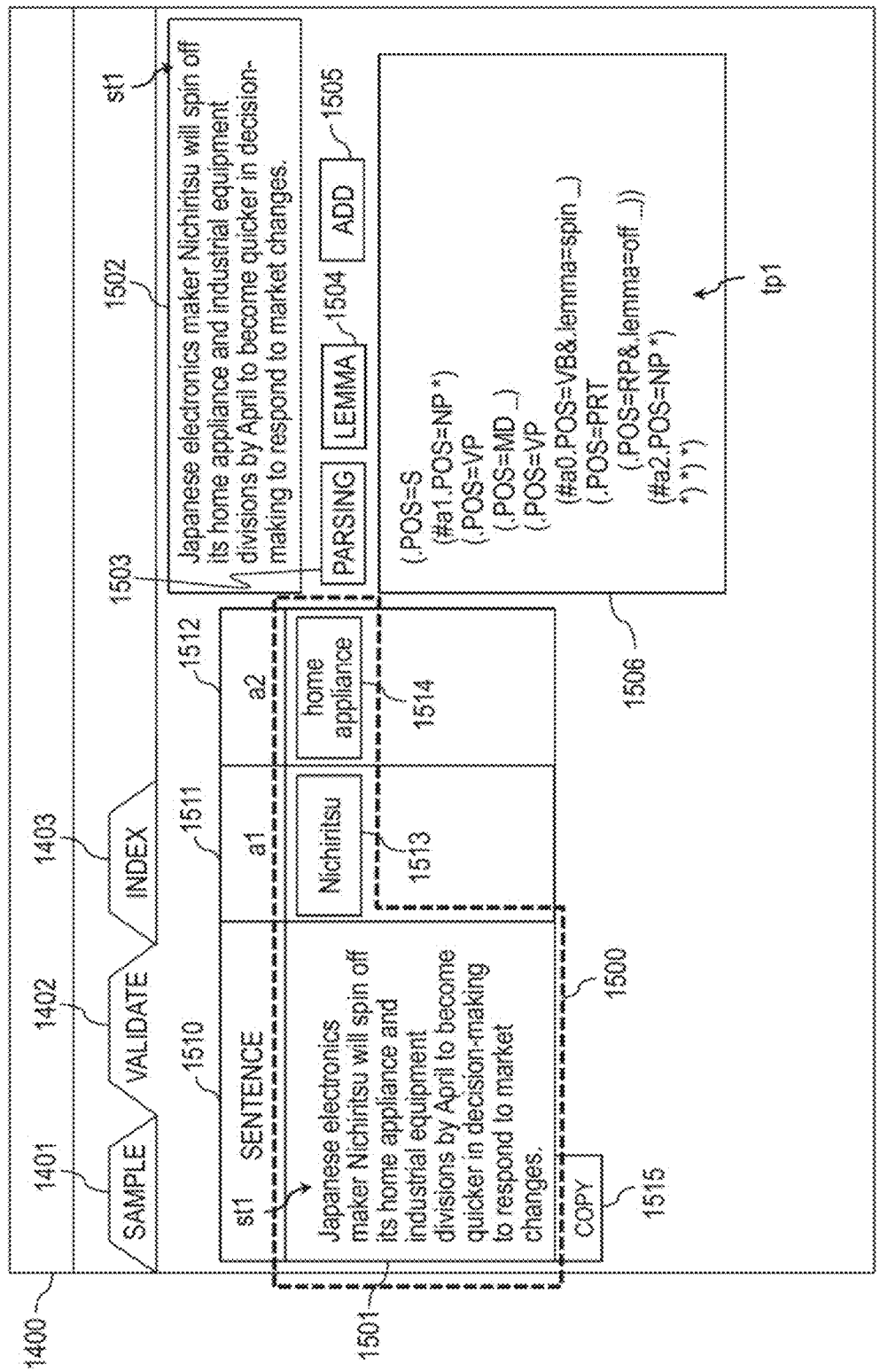
FIG. 17 is an explanatory diagram illustrating a display screen example 4 of the information processing system.

FIG. 17 is an explanatory diagram illustrating a display screen example 4 of the information processing system. The display screen example 4 is an example of the display screen in the case where the tree structure data tr1 in the edit area 1506 is edited on the display screen example 3 shown in FIG. 16. In an example, upon operation by an operator, the information processing system assigns "a0," "a1" and "a2" indicating lemmas to the words to be extracted as lemmas. The lemmas "a0," "a1" and "a2" define rules. The lemma a0 is a non-extraction-target lemma which is used as an extraction reference of other lemmas a1 and a2. That is, when the lemma a0 is a word, the lemma a0 is a non-extraction-target word matching other sentences, while when the lemma a0 is a word group, the lemma a0 is a non-extraction-target word group including words of other sentences. The lemma a1 is defined as a subject (noun phrase (NP)) for the lemma a0 in the tree structure pattern tp1, and the lemma a2 is defined as an object (noun phrase (NP)) for the lemma a0 in the tree structure pattern tp1. Thus, the noun phrase meeting the rule is extracted from other sentences.

An operator operates to delete a subtree or "lemma" (base form of a word) which is determined to be unimportant on the basis of operator's subjectivity. As shown in FIG. 11, a word defined by the tree structure data tr1 may be changed to the description of call of a word group including the word, in some cases.

Figure 18:
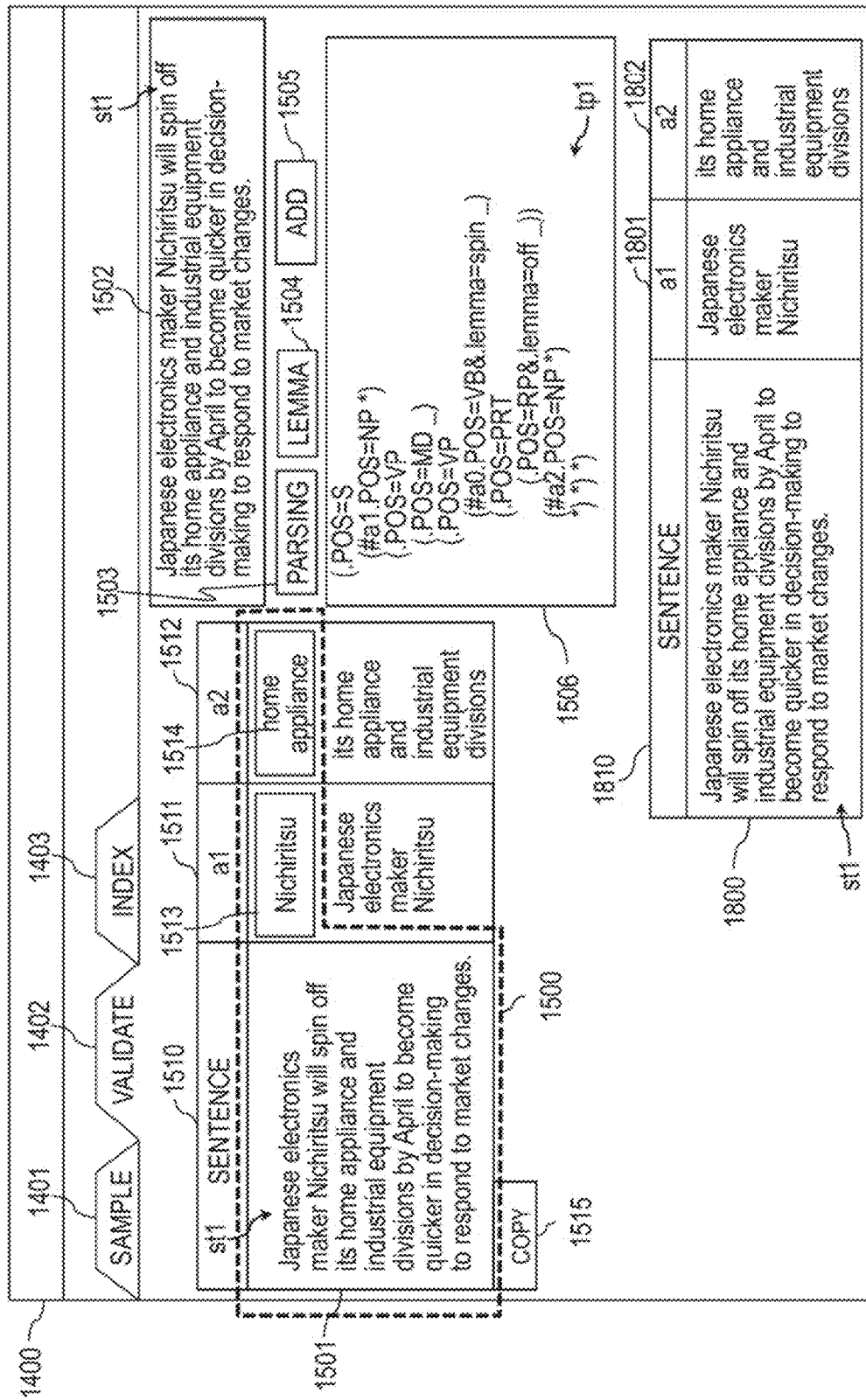
FIG. 18 is an explanatory diagram illustrating a display screen example 5 of the information processing system.

FIG. 18 is an explanatory diagram illustrating a display screen example 5 of the information processing system. The display screen example 5 is an example of the display screen in the case where the LEMMA button 1504 is pressed on the display screen example 4 shown in FIG. 17. When an operator operates to press the LEMMA button 1504, the information processing system extracts from the selected sentence st1 of the copied screen the character strings corresponding to the lemmas a1 and a2 meeting the tree structure pattern tp1 (rule) edited in the edit area 1506, and displays an extraction result 1800 (corresponding to (4) in FIG. 13). In this case, "Japanese electronics maker Nichiritsu" is extracted as the noun phrase of the lemma a1, and "its home appliance and industrial equipment divisions" is extracted as the noun phrase of the lemma a2. The extracted noun phrases of the lemmas a1 and a2 are displayed in the lemma a1 display area 1511 and the lemma a2 display area 1512, respectively.

As a result, an operator compares the word. "Nichiritsu" input into, the text input box for lemma a1 1513 with the noun phrase "Japanese electronics maker Nichiritsu" of the lemma a1 extracted according to the rule, thereby enabling confirming the certainty of the rule. Similarly, an operator compares the phrase "home appliance" input into the text input box for lemma a2 1514 with the noun phrase "its home appliance and industrial equipment divisions" of the lemma a2 extracted according to the rule, thereby enabling confirming the certainty of the rule.

When the ADD button 1505 is pressed, the character string in the edit area 1506 (edited tree structure data tr1) is regarded as the tree structure pattern tp1, and is registered as a rule with the rule DB 102 (corresponding to (5) in FIG. 13).

Figure 19:
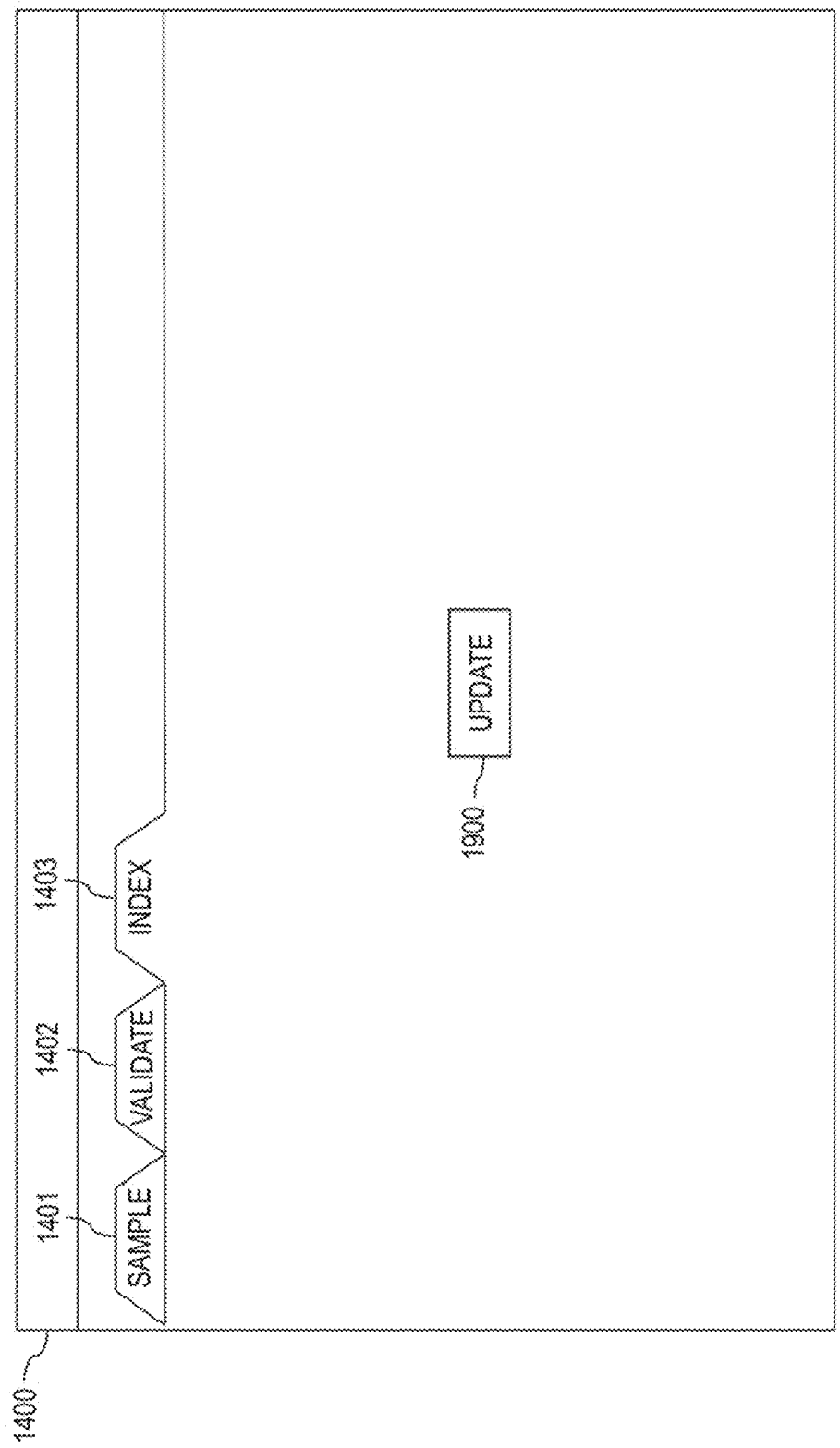
FIG. 19 is an explanatory diagram illustrating a display screen example 6 of the information processing system.

FIG. 19 is an explanatory diagram illustrating a display screen example 6 of the information processing system. The display screen example 6 is an example of the display screen in the case where the INDEX tab 1403 is selected on the display screen example 5 shown in FIG. 18. The INDEX tab 1403 has an UPDATE button 1900. When an operator operates to press the UPDATE button 1900, the information processing system registers with the data store 103 the selected sentence st1 in association with the tree structure data tr1, the noun phrase "Japanese electronics maker Nichiritsu" of the lemma a1, and the noun phrase "its home appliance and industrial equipment divisions" of the lemma a2, thereby index-updating the entry of the selected sentence st1 (corresponding to (6) in FIG. 13).

Similarly, as for other sentences, the information processing system registers with the data store 103 the noun phrase of the lemma a1 and the noun phrase of the lemma a2 meeting the role of the tree structure pattern tp1 in association with the corresponding another sentence, thereby index-updating the entry of the corresponding another sentence (corresponding to (7) in FIG. 13).

Example of Processing Procedure in Use Example of Information Processing System

Figure 20:
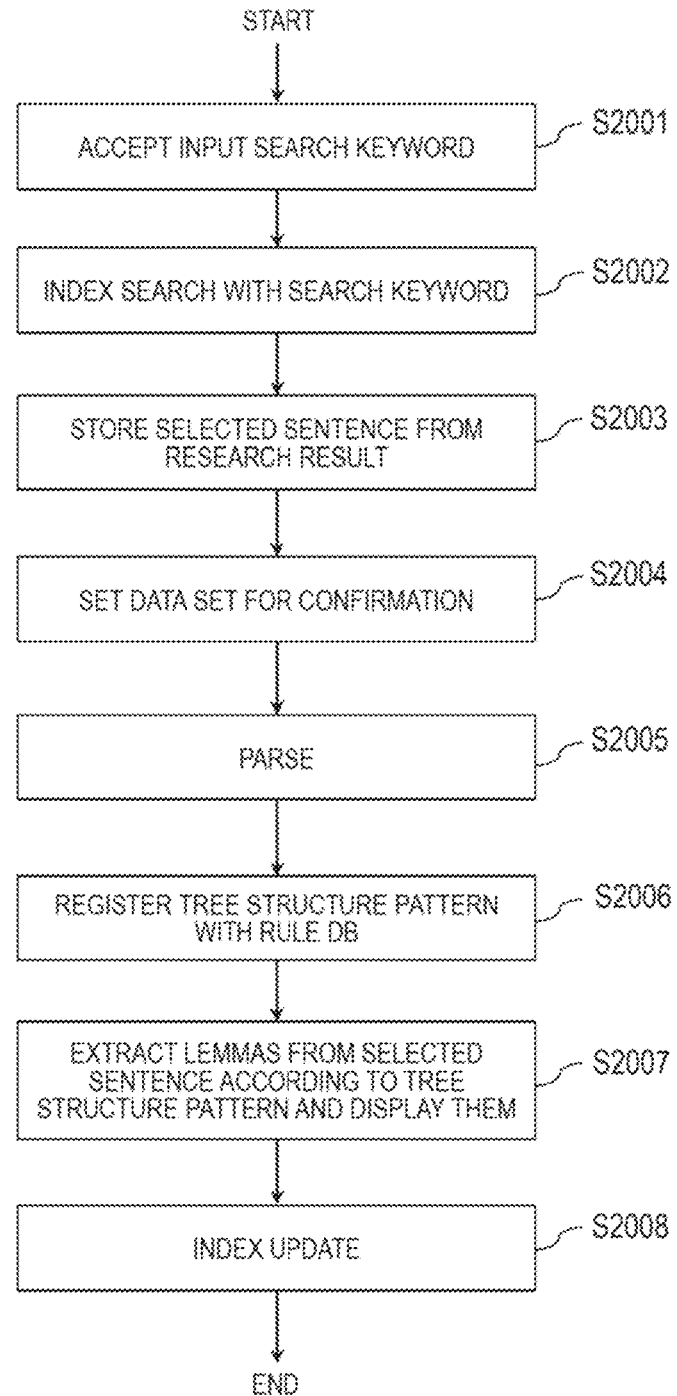
FIG. 20 is a flowchart indicating an example of processing procedure in a use example of the information processing system.

FIG. 20 is a flowchart indicating an example of processing procedure in a use example of the information processing system. As shown in FIG. 14, the information processing system accepts a search keyword input into the search keyword input box 1411 (step S2001), and executes index search by use of the input search keyword when the SEARCH button 1412 is pressed (step S2002). As shown in FIG. 14, the information processing system stores the selected sentence upon operation by an operator (step S2003).

As shown in FIG. 15, the information processing system sets the data set for confirmation 1500 upon operation by an operator (step S2004). Then, as shown in FIG. 16, the information processing system obtains the tree structure data tr1 by parsing the selected sentence st1 (step S2005). The information processing system registers with the rule DB 102 the tree structure pattern tp1 obtained by editing the tree structure data tr1, when an operator presses the ADD button 1505 (step S2006), Pressing of the ADD button 1505 corresponds to addition in step S1207 shown in FIG. 12, and registration of the tree structure pattern tp1 corresponds to step S1208 shown in FIG. 12.

As shown in FIG. 18, when an operator operates to press the LEMMA button 1504, the information processing system extracts a word or phrase of the lemma a1 and a word or phrase of the lemma a2 from the selected sentence st1 according to the rule of the tree structure pattern tp1, and displays them as the extraction result 1800 (step S2007).

It is noted that an operator may repeatedly edit the tree structure pattern tp1, and each time the information processing system may register the tree structure pattern tp1 as a rule. In this case, in step S2007, the information processing system extracts lemmas from the selected sentence for each tree structure pattern tp1. Then, as shown in FIG. 19, the information processing system index-updates the data store 103 as for the extracted lemmas (step S2008).

As described above, the above-described information processing system has the word dictionary DB 101 and the rule DB 102, and the processor 401 executes acceptance processing of accepting a maintenance request, and executes maintenance processing of performing, in the case where the maintenance request accepted in the acceptance processing is a maintenance request related to a word, maintenance of the word dictionary DB 101 as for the word group to which the word belongs, and performing, in the case where the maintenance request is a maintenance request related to a tree structure pattern, maintenance of the rule DB 102 as for the tree structure pattern.

This enables maintaining the word dictionary DB 101 and the rule DB 102, independently. In other words, the information processing system maintains only one of the word dictionary DB 101 and the rule DB 102. Therefore, even if a certain word group in the word dictionary DB 101 is maintained, there is no need to maintain the rule for using the word group in the rule DB 102. Conversely, even if a certain rule in the rule DB 102 is maintained, there, is no need to maintain a word group to be used by the rule. Accordingly, database maintenance is enabled to be facilitated.

In the case where the maintenance request related to a word is a request for addition of a word, the processor 401 executes specification processing of specifying the attribute of the word group to which the word should belong on the basis of the word. In the maintenance processing, the processor 401 adds the word to the word group having the attribute specified by the specification processing.

As a result, in the case of a request for addition of a word, although the word is additionally registered with the corresponding word group in the word dictionary DB 101, there is no need to maintain the rule using the word group in the rule DB 102. Accordingly, maintenance at the time of registering a word is enabled to be facilitated.

In the maintenance processing, when a maintenance request related to a word is a request for deletion of a word, the processor 401 deletes the word from the word group to which the word belongs.

As a result, in the case of a request for deletion of a word, although the word is deleted from the corresponding word group in the word dictionary DB 101, there is no need to maintain the rule using the word group in the rule DB 102. Accordingly, maintenance at the time of deleting a word is enabled to be facilitated.

In the maintenance processing, when a maintenance request related to a tree structure pattern is a request for addition of a tree structure pattern, the processor 401 registers with the rule DB 102 the tree structure pattern in the case where the tree structure pattern does not exist in the rule DB 102.

As a result, in the case of a request for addition of a tree structure pattern, although the tree structure pattern is additionally registered with the rule DB 102 as a new rule, there is no need to maintain the word group to be used by the new rule in the word dictionary DB 101. Accordingly, maintenance at the time of registering a tree structure pattern is enabled to be facilitated.

In the maintenance processing, when a maintenance request related to a tree structure pattern is a request for deletion of a tree structure pattern, the processor 401 deletes the tree structure pattern from the rule DB 102.

As a result, in the case of a request for deletion of a tree structure pattern, although the tree structure pattern is deleted from the rule DB 102, there is no need to maintain the word group to be used by the tree structure pattern in the word dictionary DB 101. Accordingly, maintenance at the time of registering a tree structure pattern is enabled to be facilitated.

The processor 401 is capable of accessing the data store 103 storing a plurality of sentences, and executes acquisition processing of acquiring a specific tree structure pattern by abstracting specific tree structure data corresponding to a resultant by parsing a specific sentence in the data store 103 including a specific word among the plurality of sentences, by use of a specific word group including the specific word, extraction processing of extracting, from the specific tree structure data, a word contained in a word or phrase co-occurring with the specific word group (for example, a subject or an object in the case where the specific word group is a predicate verb) in the specific tree structure pattern acquired in the acquisition processing, and outputting processing of outputting the word extracted in the extraction processing so as to be displayed on a display screen. In the maintenance processing, in the case where a maintenance request related to a specific tree structure pattern is a request for addition of the specific tree structure pattern (for example, in the case where the ADD button 1505 is pressed), the processor 401 registers the specific tree structure pattern with the rule DB 102.

As a result, a word meeting the specific tree structure pattern is enabled to be displayed as a lemma of the specific sentence. Accordingly, in an example, in the case where an operator has in advance selected a word or phrase co-occurring with the specific word group with respect to the specific sentence, the specific tree structure pattern is confirmed with respect to the certainty thereof through comparison of the selected word with the lemma, and registered with the rule DB 102.

The processor 401 is capable of accessing the data store 103 storing a plurality of sentences, and executes acquisition processing of acquiring the specific tree structure pattern by abstracting the specific tree structure data corresponding to the resultant by parsing the specific sentence in the data store 103 including the specific word among the plurality of sentences, by use of the specific word group including the specific word, extraction processing of extracting, from the specific tree structure data, the word contained in the phrase co-occurring with the specific word group in the specific tree structure pattern acquired in the acquisition processing, and updating processing of updating the data store 103 by associating the word extracted in the extraction processing with the specific sentence, in the maintenance processing, in the case where a maintenance request related to a specific tree structure pattern is a request for addition of the specific tree structure pattern, the processor 401 registers the specific tree structure pattern with the rule DB 102.

As a result, it is possible to register the word meeting the specific tree structure pattern in association with the specific sentence as the lemma thereof, and register with the rule DB 102 the specific tree structure pattern used for the association, as a rule. As a result, it is also possible to extract the specific sentence from the data store 103 by, for example, index-searching the data store 103 by use of the associated lemma as an index.

The processor 401 extracts another word contained in the phrase co-occurring with the specific word group in the specific tree structure pattern from other tree structure data corresponding to the resultant obtained by parsing another sentence than the specific sentence among the plurality of sentences, and associates the another word extracted in the extraction processing with the another sentence to update the data store 103.

As a result, another sentence in the data store 103 is also enabled to be registered in association with the another word meeting the specific tree structure pattern as a lemma of another sentence, resulting in making the rule defined by the specific tree structure pattern influence another sentence.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. An information processing system comprising a processor for executing a program and a storage device for storing the program, the information processing system further comprising:
   a word dictionary database for storing a word group corresponding to a group of words grouped according to a predetermined attribute in association with a word group identifier indicating the word group; and
   a rule database for storing a tree structure pattern, including at least one of the word group identifier and a wild card, obtained by abstracting tree structure data indicating relations between words in a sentence, by use of the word group, wherein
   a subtree is used as the wildcard when generating the tree structure pattern indicating a rule, and
   the processor executes
      acceptance processing of accepting an update request, and
      a first update processing of, when the update request accepted in the acceptance processing is an update request related to a word, updating the word dictionary database as for a word group without accessing the rule database, the word belonging to the word group and the word group including parts of speech including a verb, a noun, and an adjective, while when the update request is an update request related to the tree structure pattern, updating the rule database as for the tree structure pattern without accessing the word dictionary database, wherein the tree structure pattern is created by an editing operation in which information is deleted from the tree structure data, wherein the processor is capable of accessing a data store storing a plurality of sentences, and the processor executes:

acquisition processing of acquiring a specific tree structure pattern by abstracting specific tree structure data by parsing a specific sentence in the data store including a specific word among the plurality of sentences, by use of a specific word group including the specific word, extraction processing of extracting, from the specific tree structure data, a word contained in a word or in a phrase co-occurring with the specific word group in the specific tree structure pattern acquired in the acquisition processing, and a second update processing of updating the data store by associating the word extracted in the extraction processing with the specific sentence, and wherein in the first update processing, when the update request related to a specific tree structure pattern is a request for addition of the specific tree structure pattern, the processor registers the specific tree structure pattern with the rule database, in the extraction processing, the processor extracts another word contained in the word or in the phrase co-occurring with the specific word group in the specific tree structure pattern from other tree structure data obtained by parsing another sentence than the specific sentence among the plurality of sentences, and in the second update processing, the processor associates the another word extracted in the extraction processing with the another sentence to update the data store.

2. The information processing system according to claim 1, wherein the processor executes, when the update request related to a word is a request for addition of the word, specification processing of specifying an attribute of a word group on a basis of the word, the word going to belong to the word group, and wherein in the first update processing, the processor adds the word to the word group having the attribute specified in the specification processing.

3. The information processing system according to claim 1, wherein in the first update processing, when the update request related to a word is a request for deletion of the word, the processor deletes the word from a word group, the word belonging to the word group.

4. The information processing system according to claim 1, wherein in the first update processing, when the update request related to a tree structure pattern is a request for addition of the tree structure pattern, the processor registers the tree structure pattern with the rule database.

5. The information processing system according to claim 1, wherein in the first update processing, when the update request related to a tree structure pattern is a request for deletion of the tree structure pattern, the processor deletes the tree structure pattern from the rule database.

6. The information processing system according to claim 1, wherein calling any word group from any subtree in a rule realizes an association of the word dictionary database with the rule database.

7. An information processing method performed by an information processing system comprising a processor for executing a program, a storage device for storing the program, a word dictionary database for storing a word group corresponding to a group of words grouped according to a predetermined attribute in association with a word group identifier indicating the word group, and a rule database for storing a tree structure pattern, including at least one of the word group identifier and a wild card, obtained by abstracting tree structure data indicating relations between words in a sentence, by use of the word group, wherein a subtree is used as the wildcard when generating the tree structure pattern indicating a rule, and the processor executes acceptance processing of accepting an update request, and first update processing of, when the update request accepted in the acceptance processing is an update request related to a word, updating the word dictionary database as for a word group without accessing the rule database, the word belonging to the word group and the word group including parts of speech including a verb, a noun, and an adjective, while when the update request is an update request related to a tree structure pattern, updating the rule database as for the tree structure pattern without accessing the word dictionary database, wherein the tree structure pattern is created by an editing operation in which information is deleted from the tree structure data, wherein the processor is capable of accessing a data store storing a plurality of sentences, and the processor executes:

acquisition processing of acquiring a specific tree structure pattern by abstracting specific tree structure data by parsing a specific sentence in the data store including a specific word among the plurality of sentences, by use of a specific word group including the specific word, extraction processing of extracting, from the specific tree structure data, a word contained in a word or in a phrase co-occurring with the specific word group in the specific tree structure pattern acquired in the acquisition processing, and a second update processing of updating the data store by associating the word extracted in the extraction processing with the specific sentence, and wherein in the first update processing, when the update request related to a specific tree structure pattern is a request for addition of the specific tree structure pattern, the processor registers the specific tree structure pattern with the rule database, in the extraction processing, the processor extracts another word contained in the word or in the phrase co-occurring with the specific word group in the specific tree structure pattern from other tree structure data obtained by parsing another sentence than the specific sentence among the plurality of sentences, and in the second update processing, the processor associates the another word extracted in the extraction processing with the another sentence to update the data store.

* * * * *